United States Patent
Grove, III

(10) Patent No.: US 8,142,535 B2
(45) Date of Patent: Mar. 27, 2012

(54) HIGH DUST HOLDING CAPACITY FILTER MEDIA

(75) Inventor: Dale Addison Grove, III, Holland, OH (US)

(73) Assignee: Johns Manville, Denver, CO (US)

( * ) Notice: Subject to any disclaimer, the term of this patent is extended or adjusted under 35 U.S.C. 154(b) by 166 days.

(21) Appl. No.: 12/221,625

(22) Filed: Aug. 5, 2008

(65) Prior Publication Data

US 2010/0031618 A1    Feb. 11, 2010

(51) Int. Cl.
  *B01D 46/00*    (2006.01)
(52) U.S. Cl. .............. 55/486; 55/524; 55/527; 55/528
(58) Field of Classification Search ............ 55/DIG. 5, 55/486, 524, 527, 528
  See application file for complete search history.

(56) References Cited

U.S. PATENT DOCUMENTS

| | | | |
|---|---|---|---|
| 3,317,367 A * | 5/1967 | Koller | 428/92 |
| 4,119,543 A * | 10/1978 | Lawson et al. | 210/496 |
| 4,225,642 A * | 9/1980 | Hirakawa | 428/91 |
| 4,286,977 A * | 9/1981 | Klein | 55/524 |
| 5,667,562 A * | 9/1997 | Midkiff | 96/15 |
| 5,709,735 A * | 1/1998 | Midkiff et al. | 96/17 |
| 5,728,298 A * | 3/1998 | Hamlin | 210/491 |
| 5,785,725 A * | 7/1998 | Cusick et al. | 55/382 |
| 5,800,586 A | 9/1998 | Cusick et al. | |
| 5,948,344 A | 9/1999 | Cusick et al. | |
| 5,993,501 A | 11/1999 | Cusick et al. | |
| 6,030,484 A * | 2/2000 | Maeoka et al. | 156/309.9 |
| 6,110,251 A | 8/2000 | Jackson et al. | |
| 6,261,335 B1 | 7/2001 | Kern et al. | |
| 7,582,132 B2 * | 9/2009 | Jaffee | 55/524 |
| 7,608,125 B2 * | 10/2009 | Jaffee | 55/524 |
| 2007/0163218 A1 * | 7/2007 | Keeler et al. | 55/486 |
| 2007/0271889 A1 * | 11/2007 | Jaffee | 55/524 |
| 2007/0271890 A1 * | 11/2007 | Jaffee | 55/527 |

* cited by examiner

*Primary Examiner* — Duane Smith
(74) *Attorney, Agent, or Firm* — Robert D. Touslee

(57) ABSTRACT

Provided is a method of forming a self supporting fibrous nonwoven filter media comprising dispersing glass fibers, crimped polymer fibers, and cellulosic fibers in a fluid dispersion. The dispersion is subjected to a moving forming wire to form a fibrous web. Binder is applied to the web. The web is dried and cured/melted and later pleated in a subsequent operation. Inclusion of crimped polymer fibers in filter media improves dust holding characteristics of the filter media.

9 Claims, No Drawings

HIGH DUST HOLDING CAPACITY FILTER MEDIA

FIELD

The present disclosure relates to high capacity, self supporting filter media, and in particular to single layer lofty wet-laid filter media or dual layer filter media comprising a lofty layer and a closed efficiency layer.

BACKGROUND

High capacity filter media often consist of lofty nonwoven assemblies that allow significant incoming particle capture. Most filtration media manufacturing methods incorporate spunbond, meltblown, and/or carded media with the potential addition of a closed wet-lay layer.

The ASHRAE (American Society of Heating, Refrigerating and Air-Conditioning Engineers, Inc.) 52.2 standard rates filters on a MERV (which stands for Minimum Efficiency Reporting Valve) scale which standardizes and simplifies filter efficiency ratings for the public, and provides the initial, as received performance of a filter, allowing a contractor or building owner to select filters based on an efficiency scale. The present ASHRAE 52.2 test does, however, suffer from a number of testing flaws including the deterioration of electret filter performance with time, which is why a new optional testing procedure known as MERVa has been added to the procedure to more adequately reflect the long term performance of a filter. What the new procedure provides is longer initial dosing of KCI particles on the filter prior to the efficiency testing. MERV Designations range from MERV 1 (typically a low efficiency, throwaway filter) up to MERV 20 (a 95%-plus efficiency ULPA filter). The MERV enables one to compare efficiencies of filters at a glance. The higher the MERV rating, the higher the efficiency of the air filter.

In the past furnace filters were made from relatively coarse continuous fibers laid down in a random pattern and built up in layers on a drum and by carding dry staple fibers and forming webs of the carded fibers. Such filters fall short of removing as small of particles and as many particles as desired. Average efficiency is really not a realistic measure of filter performance because it exaggerates performance for the early part of the actual service life of the filter. This is because when a mechanical air filter is first installed its efficiency is at its lowest point because it has not built up enough lint and particles on the filter to help trap more and smaller lint and particles. Some of these filters had low efficiencies and others had other disadvantages such as low physical integrity and high bulk making pleating difficult if not impossible.

There are also a host of electret based filters, typically composed of charged polypropylene based fibers, that by MERV indications show good to excellent initial performance. However, these initial readings are misleading. There are two main drawbacks with electret based filter designs. First, the charged nature of the media leads to a rapid drop in efficiency, due to the masking of the charges by incoming particles, as the particles build on the surface of the filter, which is followed by a long slow rise in efficiency as the filter fills. The second problem with most electret filters is that they require a metal wire to permanently fold the media and to prevent bursting in actual filtration use. The metal wire, which costs roughly 2 cents/ft$^2$, clearly impacts overall filter system costs. Conventional wisdom is that it is better to use a lower density fiber to construct the filter as more surface area results, but if lower density materials require a metal wire, reconsideration is required. Accordingly, provided is a self supporting media.

SUMMARY

Provided is a method of forming a self supporting fibrous nonwoven filter media comprising dispersing glass fibers, crimped polymer fibers, and cellulosic fibers in a fluid dispersion. The dispersion is subjected to a moving forming wire to form a fibrous web. Binder is applied to the web. The web is dried and wound. Finished media is then pleated in a subsequent process step.

Also provided is a fibrous nonwoven filter media comprising 20-60 weight % glass fibers, 15-60 weight % crimped polymer fibers, 1-30 weight % cellulosic fibers; and 15-30 weight % binder. The filter media is self supporting and meets at least MERV 7 specifications.

Further provided is a self supporting fibrous nonwoven filter media comprising an open upstream layer and a closed downstream layer. The open upstream layer comprises 20-60 weight % glass fibers, 15-60 weight % crimped polymer fibers, 1-30 weight % cellulosic fibers, and 15-30 weight % binder. The closed downstream layer comprises 20-60 weight % glass fibers, 15-60 weight % polymer fibers, 1-30 weight % cellulosic fibers; and 15-30 weight % binder.

It has been discovered that inclusion of crimped polymer fibers in filter media improves dust holding characteristics of the filter media by increasing loft (i.e., open spaces within the filter media), allowing for additional room for dust in the filter media.

DETAILED DESCRIPTION

Provided is a method of forming self supporting filter media. The filter media can be a single layer or dual layer structure. The method comprises depositing glass fibers, crimped polymer fibers, and cellulosic fibers in a wet lay process, immersing the deposited fibers through a binder curtain, removing excess binder through vacuum settings, and drying the fiber/binder assembly. More specifically, the fibers of the filter media are dispersed in chemically treated water and transferred to the forming section or headbox of a wet process non-woven fibrous mat making machine. A continuous traveling or moving forming belt passes through the dewatering headbox or forming section. A vacuum applied by a series of vacuum boxes located beneath the traveling forming belt removes the water from the dewatering area of the headbox through the continuous traveling forming belt and the dispersed fibers are deposited onto the continuous traveling forming belt forming a continuous fibrous web thereon. After leaving the headbox the fibrous web is transported on the forming belt to a binder applicator in which a binder stream is applied to the fibrous web and then to a drying oven to dry the binder.

The crimped polymer fibers, can be, for example, crimped polyester fibers such as crimped polyethylene terephthalate fibers. The polymer fibers can also be any polymer fibers such as polypropylene, nylon, polybutylene terephthalate, polyacrynitrile, polybenzimidizole, and other polymer fibers having similar resilience, toughness and softening point. In an embodiment, the polymer fibers comprise polyethylene terephthalate copolymers or polyolefin core-sheath construction fibers. Use of crimped polymer (e.g., crimped polyethylene terephthalate) fibers improves dust holding characteristics of the filter media by increasing loft or decreasing filter media density.

For a dual layer structure having an upstream open wet-laid layer and a downstream closed wet-laid layer, a previously formed upstream open wet-laid layer may be present on the forming belt such that the downstream closed wet-laid layer is deposited onto the upstream open wet-laid layer to form the presently disclosed filter media. Alternatively, an upstream layer and the fibers of a downstream layer are formed on a forming belt of a non-woven fibrous mat making machine such that the fibers of one layer are consistently on top of the fibers of the other layer, thereby forming a non-woven mat, binding the non-woven mat and thereby bonding the upstream layer and the downstream layer together, and drying the filter media. Thus, the upstream open wet-laid layer and the downstream closed wet-laid layer are deposited onto the forming belt in a single step by means of a dual layer headbox. In particular, a second headbox can be added (i.e., after the primary headbox of the wet process non-woven fibrous mat making machine) such that the primary headbox lays down a first layer (e.g., the upstream open layer of the presently disclosed filter media) and the second headbox lays down a second layer (e.g., the downstream closed layer of the filter media) onto the first layer to form the filter media. Depositing the upstream open layer and the downstream closed layer in a single step can result in increased bonding between the upstream open layer and the downstream closed layer as some fiber entanglement may occur and because both of these layers will be subjected to a single binder stream layer that helps in bonding the entire structure together.

The binder composition used can be, for example, an urea-formaldehyde, modified urea-formaldehyde, melamine-formaldehyde, acrylic latex, vinyl acrylic, and/or styrene acrylate. The binder composition preferably should be hydrophobic. In an embodiment, an acrylic latex binder has a glass transition temperature, $T_g$, of greater than about 20° C., for example, greater than about 25° C. Suitable acrylic latex materials include Rhoplex™ GL-618, available from Rohm & Haas, and Hycar® 26138, a +25° C. $T_g$ material available from Lubrizol. The acrylic latex can be modified by addition of a melamine crosslinker to enhance cross-linking, which adds stiffness and heat resistance. An exemplary melamine crosslinker is Aerotex® 3030, available from Emerald Carolina Chemical, LLC. It is important to have both the necessary $T_g$ for pleatability and hydrophobicity to create good filters.

The filtration efficiency of the filter media can be controlled, in part, by varying the basis weight, the fiber diameter, and type of fiber, and the basis weight of the filter media. The binder choice can also affect sheet density by forming "bridges" or "webs" between the fibers at their crossing points, thus reducing porosity of the mat.

In an embodiment, after forming the fibrous air-laid mat, it is transferred to a moving screen running through a binder application station where the binder is applied to the mat. The binder can be applied to the structure by any suitable means including, for example, air or airless spraying, saturating, curtain coating application. Excess binder, if present, is removed by vacuum to produce a desired binder level in the filter media. The filter media can then be transferred to a moving oven belt which transports the filter media through a through air dryer.

The aqueous binder composition either cures or melts/flows under the application of heat. The filter media can be heated in an oven to effect drying and/or flow/melting/curing of the binder. For example, heated air can be passed through the filter media to remove water and cure the binder. For example, the heat treatment can be around 400° F. or higher, but in an embodiment, the filter media is at or near the hot air temperature for only a few seconds in the downstream end portion of the oven. It is important not to exceed temperatures that would cause the polymer fibers to shrink. The duration of the heat treatment can be any suitable period of time such as, for example, from about 3 seconds to a minute.

Application of the binder to the fibers yields a sufficiently stiff mat that pleats well and requires no additional mechanical support to hold the pleats such as metal wire or complex cardboard frames for the resulting filter media. Accordingly, as used herein, the phrase "self supporting" refers to a filter media that requires no additional mechanical support, such as a metal wire or additional cardboard supporting strips, to hold its pleats.

Thus, the presently disclosed filter media can be scored and pleated or folded back upon itself to form a pleated filter media, which will retain its pleats. The pleated filter media is typically formed by passing the filter media through a conventional rotary pleating process where the filter media is scored and pleated or folded back upon itself to selected degrees to form a pleated filter media having pleats of a selected size or sizes and a selected included angle or angles between the pleat portions extending between the scores. The included angles between the portions of the pleats can be uniform or vary and the size of the pleats can be uniform or vary. The pleats can be formed in the presently disclosed filter media by various conventional pleating operations, including but not limited to, rotary pleating, push bar pleating, star gear pleating. The rotary and star gear pleating methods are preferred due to the higher flexural modulus/thickness of the media. If desired for certain pleating operations, the filter media can be reheated prior to the pleating operation to facilitate the scoring of the filter media and the formation of the pleats.

In contrast to conventional filter media, the presently disclosed filter media is formed by a wet-lay process to create either a single lofty layer or a dual layer structure consisting of a lofty layer followed by a closed efficiency layer. In either case the media can be produced in a single wet-lay operational step at relatively high production rates and associated low cost. The wet-lay, high capacity media solution has sufficient stiffness such that a reinforcing wire mesh is not needed. Absence of a wire mesh has important consequences in both the cost of the overall filter and in manufacturing and consumer safety.

Advantages of the presently disclosed filter media include design flexibility. If higher stiffness is desired, more glass fibers may be added or a stiffer binder could be used. If more loft is desired, for example, for increased dust holding, either the addition of more crimped polyester fiber and/or alternative crimp design would enable greater thicknesses. If it is desired to close the media more, additional cellulose could be added. Filtration efficiencies can be boosted either with the cellulosic content or through the right combination of binders and additives.

Filter media including glass fibers, crimped polymer fibers, and cellulosic fibers facilitate a torturous path of air or gaseous flow through the filter media and results in increased filtration efficiency and also added dirt holding capacity of the filter media. The use of cellulosic fibers, for example, a chemically cross linked bleached Kraft pulp, such as CHB-SLM, available from Weyerhaeuser, increases the air perms/stiffness of the filter media. Also, use of a fully bleached softwood Kraft pulp, such as Kamloops Chinook, also available from Weyerhaeuser, adds bulk and fills the sheet sufficiently to increase filtration efficiency and adds stiffness to the mat and filter media.

The presently disclosed wet-lay filter media may consist of either a single layer, lofty product or a dual layer which includes upstream layers made up of relatively coarse diameter fibers to provide the filter media with increased dirt-holding capacity and downstream layers made up of relatively fine diameter fibers to provide the filter media with the desired filter efficiencies. The upstream layer can capture and retain coarser particles in the gas or other fluid stream being filtered so that the coarser particles do not prematurely clog the finer openings in the downstream layers and, thereby shorten the service life of the filter media.

The presently disclosed high capacity filter media includes a stiff/lofty media, which allows the filtration media to capture significant dust while being sufficiently stiff to avoid pleat collapse or filter collapse/burst under load. The presently disclosed single layer self supporting filter media comprises glass fibers, polymer fibers, cellulosic fibers, and binder. In particular, the presently disclosed self supporting filter media comprises 20-60 weight % glass fibers (e.g., ½" 10-11 micron glass fibers), 15-60 weight % crimped polymer fibers (e.g., ½" 4-6 denier crimped polyester fibers), 1-30 weight % cellulosic fibers, and 15-30 weight % binder. As used herein, weight % is on final filter media basis, unless stated otherwise.

The length of the glass and polymer fibers can range between ¼" to 1.5". The fibers should be of sufficient length to avoid wire transfer issues during mat formation, but not so long so as to suffer from dispersion issues or clogging in the distribution pipes leading to the forming headbox. Glass fibers greater than 10-11 microns would likely suffer from mat efficiency losses, whereas fibers much smaller than 10-11 microns would lose stiffness leading to a non self supporting media. The high denier/large diameter (25 microns at 6 denier) of the crimped polyester is necessary to avoid intertangling. Fine denier crimped fibers would entangle with each other such that the total ensemble would not flow with the aqueous slurry, which can lead to a forming tank containing a fibrous entangled mass and no water.

Also provided is dual layer filter media comprising an upstream open wet-laid layer and a downstream closed wet-laid layer. The upstream layer of the dual layer filter media comprises 20-60 weight % glass fibers, 15-60 weight % crimped polymer fibers, 1-30 weight % cellulosic fibers, and 15-30 weight % binder, and the downstream layer of the dual layer filter media comprises 20-60 weight % glass fibers, 15-60 weight % polymer fibers, 1-30 weight % cellulosic fibers, and 15-30 weight % binder. In particular, the upstream layer can comprise ½" 10-11 micron glass fibers and ½-¾" 4-6 denier crimped polyester fibers, and the downstream layer can comprise ½" 10-11 micron glass fibers and 0.125-0.375" 1-3 denier polyester fibers. In an embodiment, the upstream layer comprises H ½" type 137 fibers (11 micron) and ½" 6 denier crimped polyester fibers, and the downstream layer comprises H ½" glass fibers and ½" 1.5 denier polyester fibers.

The glass fibers in either the single or dual layer filter media provide stiffness to the media for the subsequent pleating operation, while the crimped polymeric fibers provide the needed loft to permit higher dust holding numbers. The crimped polymeric fibers must have sufficient diameter/denier and length to avoid entanglement of the crimped fibers during the pulping/mixing operation into an mass that is unable to be processed. The cellulosic fibers allow adjustability to the air permeability of the individual layers. By playing with the ratio of the fibers, design flexibility is possible. The pressure drop/air permeability of either media should be fairly close to each other such that both media fill at nearly the same rates.

In the dual layer structure, the lofty layer may not have sufficient pleatability characteristics. In that event the downstream layer of the presently disclosed filter media can comprise a pleatable stiffening layer, which can enable the filter media to be scored or creased, pleated and retain its pleats. In addition, the downstream pleatable stiffening layer can facilitate the handling of the upstream layer; increase the integrity of the upstream layer; minimize fiber loss through the collection chain; and, as part of the filter media, contribute to particulate filtration and block the loss of fibers from the upstream layer so that substantially no fibers from the upstream layer are carried away by the gas or liquid stream being filtered and in addition enable the filter media to be scored, pleated and retain its pleats.

The open upstream layer of the dual layer structure is similar to the single layer structure, with the exception that the single layer structure has a basis weight of approximately 1.5-3 lb/csf, for example, approximately 1.75-2.25 lb/csf, while the open upstream layer of the dual layer structure has a basis weight of approximately 1.0-3.0 lb/csf, for example, approximately 1.25-1.5 lb/csf (the closed downstream layer of the dual layer structure also having a basis weight of approximately 1.0-3.0 lb/csf, for example, approximately 1.25 lb/csf).

One measure of dust or dirt-holding capacity of the presently disclosed filter media is the weight of dust particles, in grams, fed into a filter during dust holding capacity testing. The test is run until the filter reaches 1-1.5" of water pressure drop and the amount of dust fed is recorded. In contrast, typical ASHRAE dust holding capacity numbers are a product of dust fed rate and arrestance. The dust holding capacity of the presently disclosed filter media can readily exceed 100 grams of ASRHAE dust. In an embodiment, the dust holding capacity of the presently disclosed filter media can equal or exceed example, 150 to 200 grams.

In an embodiment, the presently disclosed filter media exhibits a MERV rating of at least 6-8, for example, the filter media meets at least MERV 7 filtration efficiency (i.e., removal of greater than or equal to 50% to less than 70% of 3.0-10.0 microns particles according to ANSI/ASHRAE Standard 52.2-2007).

The following illustrative examples are intended to be non-limiting.

Examples

The filters described in Table 1 are single layer, high capacity, self supporting filters. Each of the filters had a pleat count of 30 in a filter design of 24"×24"×2".

TABLE 1

| Material | Basis Weight (lb/csf) | E3 (%) | MERV | Pressure Drop (inch H$_2$O) | Dust Fed Capacity at 1" (grams) | Dust Fed Capacity at 1.5" (grams) |
|---|---|---|---|---|---|---|
| A | 3.25 | 73 | 8 | 0.25 | 170 | 210 |
| B | 2.50 | 70 | 8 | 0.24 | 190 | 229 |
| C | 3.25 | 69 | 7 | 0.25 | 160 | 196 |
| D | 2.50 | 56 | 7 | 0.27 | 220 | 266 |
| E | 3.00 | 48 | 6 | 0.24 | 160 | 223 |
|  |  | 45 | 6 | 0.22 | 120 | 146 |
| F | 3.50 | 61 | 7 | 0.25 | 137 | 167 |
|  |  | 57 | 7 | 0.25 | 125 | 152 |

TABLE 1-continued

| Material | Basis Weight (lb/csf) | E3 (%) | MERV | Pressure Drop (inch H₂O) | Dust Fed Capacity at 1" (grams) | Dust Fed Capacity at 1.5" (grams) |
|---|---|---|---|---|---|---|
| G | 3.25 | 58 | 7 | 0.25 | 155 | 188 |
|   |      | 56 | 7 | 0.24 | 120 | 144 |
| I | 3.50 | 48 | 6 | 0.23 | 130 | 161 |
| J | 4.00 | 52 | 7 | 0.25 | 115 | 138 |

Material A was comprised of 32% H ½" type 117 wet chop, 40% ½" crimped Barnet crimped polyester, 8% cellulose, and balance modified urea formaldehyde binder. Material B was similar to material A, but with a lower basis weight. Material C was similar to material A, but with a melamine-formaldehyde binder. Material D was similar to material A, but with a lower basis weight, a modified acrylic binder, and a changed crimped style. Material E was similar to material D, but with a different basis weight. Material F was similar to material D, but with a different basis weight. Material G was similar to material D, but with a different basis weight. Material I was similar to material H, but with a different basis weight. Material J was similar to material H but with a different basis weight.

The filters described in Table 2 are dual layer, high capacity, self supporting filters. The first layer was a mat consisting of 35 weight % 10 micron glass fibers, 50 weight % ¼" 1.5 denier polyester fibers, and 15 weight % cellulose, total fibers basis. The first layer had a basis weight of 1.25 lb/csf (including binder). Each of the filters had a filter design of 24"×24"×2". The binder employed was used through the entire structure for the dual layer media.

TABLE 2

| Layer 2 | Pleats | Pressure Drop (inch H₂O) | E3 | MERV | Dust Fed Capacity at 1.5" (grams) |
|---|---|---|---|---|---|
| Material E with Vinyl Acrylic Binder | 30 | 0.4" | 77 | 8 | 70 |
| Material E with Acrylic Binder | 30 | 0.35" | 72 | 8 | 73 |

While various embodiments have been described, it is to be understood that variations and modifications may be resorted to as will be apparent to those skilled in the art. Such variations and modifications are to be considered within the purview and scope of the claims appended hereto.

What is claimed is:

1. A fibrous nonwoven filter media comprising:
an open upstream layer comprising:
20-60 weight % glass fibers;
15-60 weight % crimped polymer fibers;
1-30 weight % cellulosic fibers; and
15-30 weight % binder; and
a closed downstream layer comprising:
20-60 weight % glass fibers;
15-60 weight % polymer fibers;
1-30 weight % cellulosic fibers; and
15-30 weight % binder;
wherein the filter media is self supporting;
has a dust holding capacity of greater than or equal to 100 grams of ASRHAE dust; and
exhibits a MERV rating of at least 7.

2. The filter media of claim 1, wherein:
the open upstream layer comprises:
20-60 weight % ½" 10-11 micron glass fibers; and
15-60 weight % ½-¾" 4-6 crimped polymer fibers; and
the closed downstream layer comprises:
20-60 weight % ½" 10-11 glass fibers; and
15-60 weight % 0.125-0.375" 1-3 denier polymer fibers.

3. The filter media of claim 2, wherein:
the open upstream layer comprises:
20-60 weight % H ½" type 137 fibers (11 micron) glass fibers; and
15-60 weight % ½" 6 denier crimped polymer fibers; and
the closed downstream layer comprises:
20-60 weight % ½" H ½" glass fibers; and
15-60 weight % ¼" 1.5 denier polyester denier polymer fibers.

4. The filter media of claim 1, wherein the filter media exhibits a MERV rating of at least 8.

5. A method of forming the filter media of claim 1, the method comprising:
depositing the fibers of an upstream layer and the fibers of a downstream layer onto a forming belt of a non-woven fibrous mat making machine such that the fibers of one layer are consistently on top of the fibers of the other layer, thereby forming a non-woven mat having two layers;
binding the non-woven mat and thereby bonding the upstream layer and the downstream layer together; and
drying the filter media.

6. The method of claim 5, wherein the upstream layer and the downstream layer are depositing onto a forming belt of a non-woven fibrous mat making machine in a single operating step using a dual layer headbox.

7. The method of claim 5, wherein bonding the upstream layer and the downstream layer together comprises running the upstream layer and the downstream layer under a binder stream.

8. The method of claim 5, further comprising pleating the filter media.

9. The filter media of claim 1, wherein the filter media comprises from 15-30 weight % cellulosic fibers in at least one of the upstream and downstream layers.

* * * * *